US009367526B1

(12) United States Patent
Vozila et al.

(10) Patent No.: US 9,367,526 B1
(45) Date of Patent: Jun. 14, 2016

(54) WORD CLASSING FOR LANGUAGE MODELING

(75) Inventors: Paul Vozila, Arlington, MA (US);
Maximilian Bisani, Limbourg (BE); Yi Su, Montreal (CA); Stephen M. Chu, Elmstord, NY (US); Stanley F. Chen, Yorktown Heights, NY (US); Ruhi Sarikaya, Shrub Oak, NY (US); Bhuvana Ramabhadran, Mount Kisco, NY (US)

(73) Assignee: Nuance Communications, Inc., Burlington, MA (US)

( * ) Notice: Subject to any disclaimer, the term of this patent is extended or adjusted under 35 U.S.C. 154(b) by 712 days.

(21) Appl. No.: 13/190,891

(22) Filed: Jul. 26, 2011

(51) Int. Cl.
G06F 17/27 (2006.01)
G06F 17/30 (2006.01)
G06F 17/21 (2006.01)
G06Q 10/10 (2012.01)

(52) U.S. Cl.
CPC .......... *G06F 17/218* (2013.01); *G06F 17/2785* (2013.01); *G06Q 10/107* (2013.01)

(58) Field of Classification Search
USPC ............................................................ 704/9
See application file for complete search history.

(56) References Cited

U.S. PATENT DOCUMENTS

| 5,267,345 | A * | 11/1993 | Brown et al. | 704/255 |
|---|---|---|---|---|
| 7,120,582 | B1 * | 10/2006 | Young et al. | 704/255 |
| 7,333,985 | B2 * | 2/2008 | Weare | |
| 7,447,635 | B1 * | 11/2008 | Konopka et al. | 704/275 |
| 8,386,574 | B2 * | 2/2013 | Chidlovskii et al. | 709/206 |
| 2002/0196679 | A1 * | 12/2002 | Lavi et al. | 365/200 |
| 2003/0046078 | A1 * | 3/2003 | Abrego et al. | 704/260 |
| 2003/0083863 | A1 * | 5/2003 | Ringger et al. | 704/10 |
| 2005/0216265 | A1 * | 9/2005 | Chelba et al. | 704/240 |
| 2006/0253274 | A1 * | 11/2006 | Miller | 704/9 |
| 2006/0277031 | A1 * | 12/2006 | Ramsey | 704/9 |
| 2007/0078653 | A1 * | 4/2007 | Olsen | 704/240 |
| 2008/0071536 | A1 * | 3/2008 | Nagashima | 704/246 |
| 2008/0235017 | A1 * | 9/2008 | Satomura | 704/246 |
| 2008/0243481 | A1 * | 10/2008 | Brants et al. | 704/9 |
| 2009/0171662 | A1 * | 7/2009 | Huang et al. | 704/251 |

(Continued)

OTHER PUBLICATIONS

Merkel, A., & Klakow, D. (2007). Improved methods for language model based question classification, 2007, In Interspeech (pp. 322-325).*

(Continued)

*Primary Examiner* — David Hudspeth
*Assistant Examiner* — Timothy Nguyen
(74) *Attorney, Agent, or Firm* — Chapin IP Law, LLC

(57) ABSTRACT

A language processing application employs a classing function optimized for the underlying production application context for which it is expected to process speech. A combination of class based and word based features generates a classing function optimized for a particular production application, meaning that a language model employing the classing function uses word classes having a high likelihood of accurately predicting word sequences encountered by a language model invoked by the production application. The classing function optimizes word classes by aligning the objective of word classing with the underlying language processing task to be performed by the production application. The classing function is optimized to correspond to usage in the production application context using class-based and word-based features by computing a likelihood of a word in an n-gram and a frequency of a word within a class of the n-gram.

22 Claims, 6 Drawing Sheets

(56) References Cited

U.S. PATENT DOCUMENTS

| | | | | |
|---|---|---|---|---|
| 2009/0326936 | A1* | 12/2009 | Nagashima | 704/235 |
| 2010/0145694 | A1* | 6/2010 | Ju et al. | 704/235 |
| 2011/0035379 | A1* | 2/2011 | Chen et al. | 707/740 |
| 2013/0024403 | A1* | 1/2013 | Chen et al. | 706/12 |
| 2013/0346059 | A1* | 12/2013 | Brants et al. | 704/2 |

OTHER PUBLICATIONS

Schutze Hinrich, Integrating history-length interpolation and classes in language modeling, Proceedings of the 49th Annual Meeting of the Association for Computational Linguistics, Portland, Oregon, Jun. 19-24, 2011, 1516-1525, Association for Computational Linguistics, 2011.

Brown et al., Class-Based n-gram Models of Natural Language, Computational Linguistics, 1992, pp. 467-479, vol. 18, No. 4, Association for Computational Linguistics.

Chen, Stanley F., Performance Prediction for Exponential Language Models, Annual Conference of the North American Chapter of the Association for Computational Linguistics, 2009, Association of Computational Linguistics, Stroudsburg, PA, ISBN: 978-1-932432-41-1.

Chen, Stanley F., Shrinking Exponential Language Models, Annual Conference of the North American Chapter of the Association for Computational Linguistics, 2009, Association of Computational Linguistics, Stroudsburg, PA, ISBN: 978-1-932432-41-1.

Chen et al., Scaling Shrinkage-Based Language Models, IEEE Workshop on Automatic Speech Recognition & Understanding 2009, ASRU 2009, ISBN 978-1-4244-5478-5.

Martin et al., Algorithms for Bigram and Trigram Word Clustering, Speech Communication 24, 1998, pp. 19-37, Elsevier Science B.V.

McMahon et al., Improving Statistical Language Model Performance with Automatically Generated Word Hierarchies, Dept. of Computer Science, The Queen's University of Belfast, Mar. 9, 1995, Belfast, Ireland.

Kneser et al., Improved Clustering Techniques for Class-Based Statistical Language Modelling, 3rd European Conference on Speech Communication and Technology, Eurospeech 93, Sep. 1993, pp. 973-976, Berlin, Germany.

Yamamoto et al., Multi-Class Composite N-gram Language Model, Speech Communication 41, 2003, pp. 369-379, Elsevier B.V.

* cited by examiner

WORD CLASSING FOR LANGUAGE MODELING

BACKGROUND

Conventional language processing receives user speech and processes the received voice signals into text, typically represented as an alphanumeric string (text) of characters in a target language for which the language processing application is configured. Language processing may be employed in a variety of contexts by supplementing or replacing conventional keyboard input with a speech recognition component or module for converting speech into text. Speech recognition capabilities therefore accompany other production applications for providing an alternate input path to allow spoken commands and data as an alternative to manual keyboard entry. The speech recognition component executes as a language processing application in communication with the production application for which they perform the speech recognition.

Language processing applications therefore often operate in conjunction with production applications for interpreting spoken, rather than typed, commands and messages from a user. In a typical language processing context, the language processing application converts speech received from a user to text corresponding to the spoken words. The text is then employed as input to the production application in a similar manner as if entered via a keyboard.

The language processing application interprets spoken words by employing a language model. The language model computes, for a given sequence of words, a likelihood of a successive word in the sequence. A classing function assists generation of the language model by grouping words that tend to occur in similar contexts, i.e. following certain other words. Classing functions that group words according to their usage in the corresponding language processing application are said to be optimized, as the optimization results in a high likelihood of predicting the next word from a sequence of words Various approaches to automatic processing of human languages typically attempt to deduce appropriate classes for words and make proper assignments. For example, a reasonable class is days of a week which for English might contain words: Monday, Tuesday, Sunday, and etc. It is of course possible to determine such a classing manually for a given language. However, word classing is not unique; for example, it might be more desirable to put "Saturday" and "Sunday" into a separate class for some applications. It thus quickly becomes intractable for permuting all such possibilities. In language models, classing is applied to sequences, or clusters, or words. The sequence of N words is referred to as a cluster size, typically denoting the cluster size as an N-gram. Cluster sizes of 2 and 3 (bigram and trigram) are common as rapid growth of processing demands impacts larger cluster sizes.

SUMMARY

A language processing application employs a classing function optimized for the underlying production application context for which it is expected to process speech. Typically, a language model employs a mix of class-based and word-based features, in which the classing function is expected to identify classes as encountered by the corresponding production application. Classing functions are therefore developed, or trained, from a training set of words expected to approximate the patterns of words received by the corresponding production application. The classing function arranges the words such that words in a class receive similar treatment as other words in the class, i.e. any word in the class is deemed to have a similar likelihood of following a particular sequence of words. A word based approach, in contrast to a class based approach, builds language models using word-level statistics, but may encounter computability and performance issues due to the number of possible combinations. A combination of class based and word based features relies on a classing function optimized for the particular production application, meaning that the language model employing the classing function uses word classes having a high likelihood of accurately predicting word sequences employed in the context of the production application.

While production language models (LMs) often employ some combination of class-based and word based features, configurations herein are based, in part, on the observation that conventional language models employed for speech processing rely on a classing function because more robust word based approaches require substantial computational resources often not feasible in a personal or consumer oriented device providing the production application. Therefore, for LMs that use word n-grams or a combination of word and class n-grams, configurations herein are directed toward deducing word classifications which are optimized for this hybrid as opposed to approaches that effectively pretend that a class n-gram model will be used exclusively. In a system employing a pure class based model, then the pre-existing word classing algorithms would be appropriate It should be noted that the classing approaches, or models, are employed to generate word classes, which is then, in turn, used by a language models for supporting a production application that receives speech or text from a user. The classing approaches disclosed here generate word classes, whish are subsequently employed by a language model. More optimal, or better classing functions allow improved performance from a language model employing those classes.

One conventional widely-used method for automatic word classing for language modeling is the method of Brown et al. (Brown, P. F., Della Pietra, V. J., de Souza, P. V., Lai, J. C., Mercer, R. L., 1992. "Class based n-gram models of natural language." Computational Linguistics 18 no. 4, 467-479.) In this algorithm, classes are chosen to optimize the likelihood of a training set according to a simple class-based bigram (2 word) model. The classing is in essence determined regardless of the actual language model in which it would be used One particular algorithm for searching for word classes in the Brown method is the exchange algorithm. In this algorithm, after initialization, one repeatedly loops through the words in the vocabulary in decreasing frequency order, finding the class for each word that maximizes the objective function. An exchange move is performed if that class is different than a word's current class. The algorithm terminates when there are no more exchange moves that improve the objective function. A particular shortcoming of the exchange algorithm is that it can only move one word at a time. There are cases in which it may be possible to escape a local minimum only by moving a group of words together. For example, we may have two classes that should be merged into one, where moving any single word by itself between classes hurts the objective function; or we may have a class that should be split in two, where splitting off each member word by itself doesn't help.

A popular conventional technique for inducing word classes for language modeling is bigram mutual information clustering, where classes are chosen to optimize the training set likelihood of a simple class-based bigram model. In particular, each word belongs to only a single class, given by:

$$p(w_1 \ldots w_l) = p(c_1 \ldots c_{l+1}, w_1 \ldots w_l) \quad (1)$$
$$= \prod_{j=1}^{l+1} p(c_j \mid c_{j-1}) p(w_j \mid c_j)$$

for a sentence w1 ... w1 where cj is the class for word wj and where cl+1 is taken to be a distinguished end-of-sentence token. Typically, classes induced using this conventional algorithm were plugged into a class-based n-gram language model of the same basic form.

Another group of language models employs so-called exponential n-grams. Recently, a new class-based n-gram model, a so-called Model M, has been shown to give excellent performance across a variety of domains and tasks. The form of the model is $$p(w_1 \ldots w_l) = \quad (2)$$
$$\prod_{j=1}^{l+1} p_{ng}(c_j \mid c_{j-2} c_{j-1}, w_{j-2} w_{j-1}) \times \prod_{j=1}^{l} p_{ng}(w_j \mid w_{j-2} w_{j-1} c_j)$$

where png(yl!) denotes an exponential n-gram model and where png(yl!1, !2) denotes a model containing all features in png(yl!1) and png(yl!2). In previous work with Model M, classes were generated using conventional classing algorithm, but we note that Model M is very different from the model used in conventional classing. Particularly, unlike in eq. (1), the probabilities of the current class and word are conditioned directly on the identities of preceding words. Thus, in conventional approaches there is a mismatch between Model M and the model used to select its word classes.

Configurations disclosed below improve the performance of conventional Model M classing by developing a clustering algorithm that is tailored specifically to this model. While Model M may be too complex to be used directly for word clustering, configurations herein demonstrate that choosing classes to optimize the likelihood of a simplified version of Model M leads to much better performance than with conventional classing.

Unfortunately, conventional approaches suffer from the shortcoming that conventional classing functions are not optimized to the production application that they support. The production application includes the deployed language model operating on actual user usage, which may be part of a personal communication device, a PC speech to text utility, or other speech responsive application, for example. Class based approaches, since they treat all words in a class similarly, may obtain more accurate predictions of actual usage for some words in the class than for others. Less than optimal classing therefore decreases the accuracy of predictions and also tends to hinder performance. In such conventional approaches, all information about the word history must be encoded in word classes, and as a result, frequent words tend to be spread across word classes. In contrast, in the present approach, when the class-based model is used in conjunction with word n-gram features (as discussed above), this anomaly of frequency-skewed words no longer holds, and frequent words are free to be placed where they best belong.

As the probability estimates of a given word are based on counts of previous occurrences of n-grams (clusters) containing the given word, an unseen n-gram exemplifies a zero or null probability. Therefore, for commonly used words, the word based counts produce a sharper, more accurate probability. In class based processing, an occurrence of any word in the class triggers the count. Thus, an unseen cluster still has a nonzero probability if any word in the class has occurred. The class based processing provides a broader recognition scope by not requiring exact previous occurrences of a cluster, but instead asks if a "similar" n-gram has appeared, similarity being defined by the classes and similar treatment of the words in the class. Since class selection defines words that are considered "similar", the class selection is significant and tied to the context of the production application.

Accordingly, configurations herein substantially overcome the above described shortcomings by employing a classing function which optimizes word classes by aligning the objective of word classing with the underlying language processing task to be performed by the production application. The disclosed approach approximates the actual language modeling outcome that make clustering tractable, or computationally feasible.

In further detail, in the configurations disclosed and claimed herein, a language model employs a classing function defining classes of words, in which each of the classes grouping words sharing a similar likelihood of appearing in a production application context, configurations herein perform a method of optimizing the classing function by identifying a language context corresponding to a production application, and defining a training corpus (training set) having a set of clusters indicative of expected usage, such that the clusters are n-grams having a sequence of n words for defining a probability that the first n−1 words in the sequence is followed by word n in the sequence. A language processing server builds a language model for usage with a production application from a classing function applied to the training corpus. In the disclosed approach, the classing function is optimized to correspond to usage in the identified language context using class-based and word-based features by computing a likelihood of a word in an n-gram and a frequency of a word within a class of the n-gram.

In a particular example arrangement, in which the language model defines a probability for sequences of words, the language model is invoked by a production application responsive to an end user for performing statistical language recognition services. The language processing server first defines a language model for predicting a likelihood of sequences of words received from the production application, such that the language model has been trained using a classing function for assigning words to classes. The word classes group words for receiving similar treatment as other words in the class, employing the classing methods discussed above to achieve optimal word classes. The language processing server identifies a language context corresponding to the usage of the language as received by the production application, and defines the classing function for scanning a learning set and identifying the word classes. The classing function therefore "trains" the language model as employed by the production application. It should be noted that there are two separate processes involved: a) Training the language model (and the word classes) on a training set, and b) employing the models in a speech recognition application, or, testing the models on a test set. The training is typically done offline, prior to actual usage by the production application, and the paragraph might give the reader the impression that the training is online. The language processing server may therefore represent distinct systems invoked for training to generate the word classes using the classing function, and testing/using the word classes in a language model.

After determining the classing function, a classifier applies the classing function to the learning set to generate the word classes, such that the word classes are indicative of words statistically likely to be employed following a predetermined sequence of words in a cluster. The classifier optimizes the classing function by selecting the word classes based on objective of the production application. Such optimization further includes analyzing word counts and class counts of the learning set, and analyzing word frequency within an assigned class, in which the objective of the production application is defined by the identified language context.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
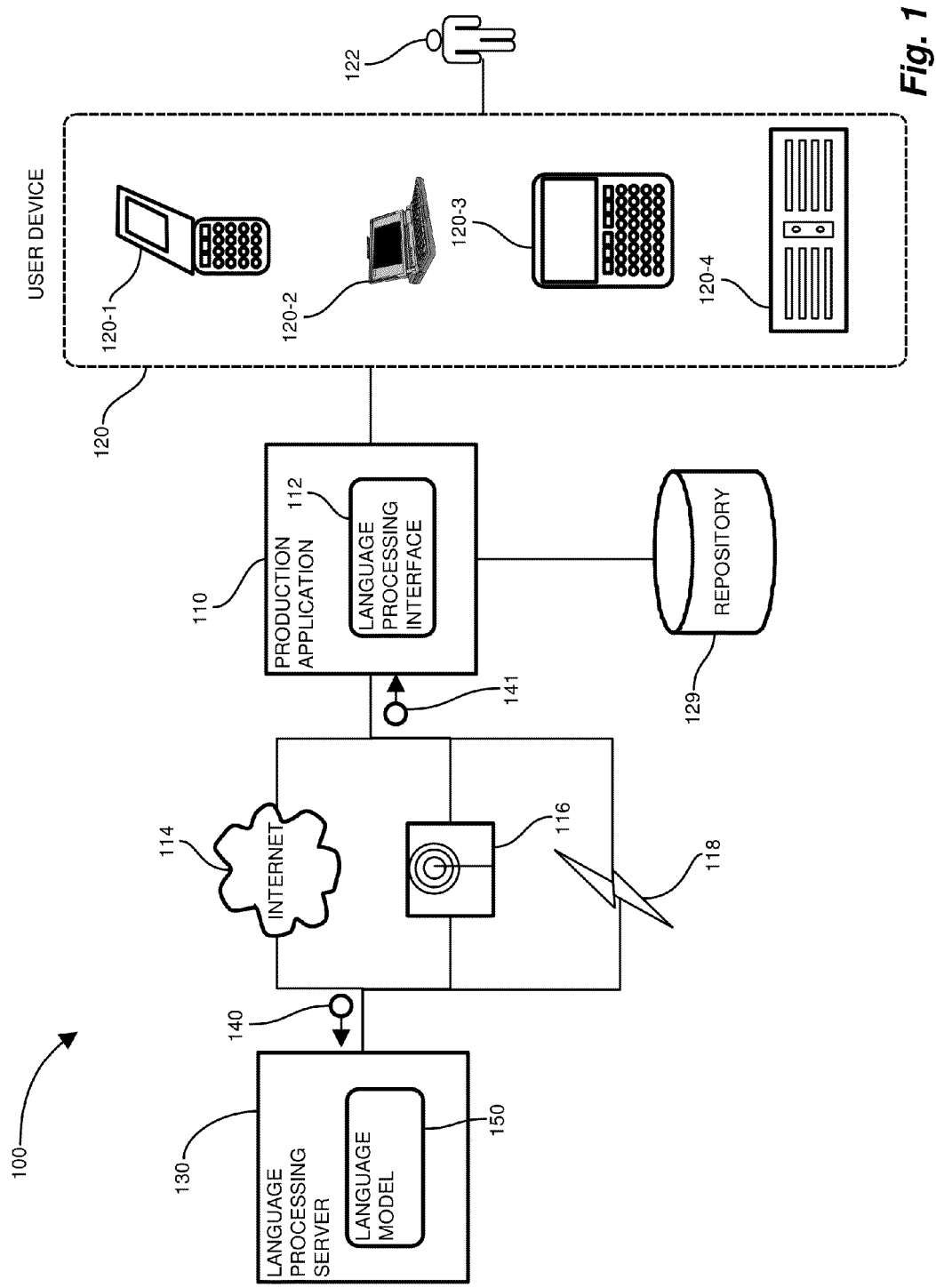
FIG. 1 is a context diagram of a language processing environment suitable for use with configurations disclosed herein.

In a language processing application, audio data representative of spoken user input is converted to text. In such a language processing application, it is beneficial to attempt to predict successive words spoken by a user based on previous words.

Accurately predicting the next word simplifies and reduces processing requirements by narrowing the selections from which the language processing application must identify the next word. The language processing application develops and employs a predictive language model (language model) for quantifying a likelihood of a particular word as the next in a sequence of words. Often, this is expressed as a probability P for, given a sequence of N−1 words, the identity of Nth word. Words with a high likelihood of appearance are evaluated first as the most likely candidate.

In the example arrangement, one feature is to optimize word classes by aligning the objective of word classing with the underlying language processing task. In theory, the best way to optimize classes which are to be used in a particular class-based language model is to select classes which directly optimize the likelihood of that model on data. However, choosing word classes to directly optimize the target language model is in general not computationally feasible. It would be beneficial to approximate the actual language modeling outcome that make clustering tractable.

The sequence of N words is referred to as a cluster size, typically denoting the cluster size as an N-gram. Cluster sizes of 2 and 3 (bigram and trigram) are common as exponential growth of processing demands rapidly impacts larger cluster sizes. A predictive model based on the cluster size is developed based on previously encountered sequences of words. Often a training set, or training corpus, of words are employed to populate the predictive model, and the trained predictive model is them employed on actual speech based input in a production application such as a cellphone, voice menu, or other speech recognition context. The language model may therefore be syntactically expressed as P(w3|w1w2), representing the probability P that w3 follows occurrences of w1 and w2.

In conventional classing, classes are chosen to maximize the likelihood of the training data according to the model given in eq. (1), where p(cj|cj−1) and p(wj|cj) are estimated using maximum likelihood estimation. Given a classing C, or assignment of each word in the vocabulary to a word class, the log likelihood L2g(C) of the training data can be written as $$L_{2g}(C) = \sum_{w_{j-1} w_j} C(w_{j-1} w_j) \log p(w_j | w_{j-1}) \quad (3)$$

$$= \sum_{w_{j-1} w_j} C(w_{j-1} w_j) \log \frac{C(c_{j-1} c_j)}{C(c_{j-1})} \frac{C(w_j)}{C(c_j)} \quad (4)$$

where $C(\omega)$ is the training set count of the n-gram $\omega$. Note that $C(cj-1)$ is the count of class $cj-1$ in the history position while $C(cj)$ is the count of class $cj$ in the predicted position. Our goal is to find the classing $C^*$ satisfying:

$$C^* = \underset{C}{\operatorname{argmax}} L_{2g}(C) \quad (5)$$

$$= \underset{C}{\operatorname{argmax}} \sum_{c_{j-1} c_j} C(c_{j-1} c_j) \log C(c_{j-1} c_j) -$$

$$\sum_{c_{j-1}} C(c_{j-1}) \log C(c_{j-1}) - \sum_{c_j} C(c_j) \log C(c_j) \quad (6)$$

Intuitively, the optimal model for inducing word classes is the actual language model in which the word classes will be used. However, choosing classes that directly optimize the likelihood of Model M is impractical due to computational cost. Thus, configurations disclosed herein find a class-based language model for which class induction is efficient, but which still approximately reflects the quality of word classes when used in Model M. Changes to the conventional classing objective function include replacing eq. (3) with the following:

$$L_{2g}^{joint}(C) = \sum_{w_{j-1}w_j} C(w_{j-1}w_j) \log p(w_{j-1}w_j) \quad (7)$$

In other words, this approach changes the conditional n-gram probability to a joint one. This can be viewed as converting the training text into its component bigrams, each generated independently. This choice is motivated in two ways. First, as will be discussed further below, this change makes it easier to estimate the performance of the model on unseen data. Second, it allows an interesting generalization of conventional classing objective function. Notice that the class bigram term in eq. (6) is positive, which implies that the lower the entropy of the distribution $C(c_j-1c_j)$, the better the score of a word classing. That is, a good classing should result in high counts for fewer class bigrams, rather than counts evenly spread across all class bigrams. However, consider the trigram version of eq. (6)

$$C^* = \arg\max_C L_{3g}(C) \quad (8)$$

$$= \arg\max_C \sum_{c_{j-2}c_{j-1}c_j} C(c_{j-2}c_{j-1}c_j) \log C(c_{j-2}c_{j-1}c_j) -$$

$$\sum_{c_{j-2}c_{j-1}} C(c_{j-2}c_{j-1}) \log C(c_{j-2}c_{j-1}) - \sum_{c_j} C(c_j) \log C(c_j)$$

The class bigram term is negative, which implies that classings with high class bigram entropy are encouraged. This seems counterintuitive; we expect good trigram classings should have both low class bigram and trigram entropies. We hypothesize that this discrepancy arises because conventional classing assumes that class distributions are estimated via maximum likelihood, while in practice we care how classes perform in smoothed distributions. It is straightforward to address this discrepancy in joint modeling. For the bigram case, expanding eq. (7) leads to exactly eq. (6). For the trigram case, we get:

$$C^* = \arg\max_C L_{3g}^{joint}(C) \quad (9)$$

$$= \arg\max_C \sum_{c_{j-2}c_{j-1}c_j} C(c_{j-2}c_{j-1}c_j) \log C(c_{j-2}c_{j-1}c_j) -$$

$$\sum_{c_{j-2}} C(c_{j-2}) \log C(c_{j-2}) - \sum_{c_{j-1}} C(c_{j-1}) \log C(c_{j-1}) -$$

$$\sum_{c_j} C(c_j) \log C(c_j) \quad (10)$$

To get the desired behavior of having both positive bigram and trigram terms, we combine eqs. (6) and (10) like so:

$$C^* = \arg\max_C L_{2g}^{joint}(C) + L_{3g}^{joint}(C) \quad (11)$$

This can be interpreted as duplicating the training set, expanding one copy to its component bigrams and one into trigrams.

In the above described conventional classing model and Model M as given in eqs. (1) and (2), one particular difference is that Model M conditions directly on previous words when predicting classes and words, while the conventional class model does not. Hence, it is logical to account for word n-gram features in the model we use for selecting classes.

When accounting for word n-gram features, it seems reasonable to use word n-gram probabilities for word n-grams in the training data, and only to backoff to class n-gram probabilities for unseen word n-grams. In this case, one cannot do meaningful classing by optimizing the likelihood of the training data, since class n-grams will never be used on the training set. Instead, we would like to estimate the performance of word classings on unseen data, or test data. One method for doing this is the leaving-one-out method [2]; here, we use ideas from smoothing such as the Good-Turing estimate to make educated guesses about the average counts of different types of seen and unseen events. Given these counts, we do maximum likelihood estimation of the model parameters and then compute the likelihood of our hypothetical test set with this model. In this way, we can select word classes that optimize an estimate of test set likelihood, rather than training set likelihood. The approach for the bigram case is outlined below; a test set log likelihood can be expressed as:

$$\tilde{L}_{2g}^{joint}(C) = C_{tot} \sum_{w_{j-1}w_j} \tilde{p}(w_{j-1}w_j) \log \tilde{p}(w_{j-1}w_j) \quad (12)$$

where $C_{tot}$ is the number of words in the training set D (and hypothetical test set) and where '~' is used to mark quantities estimated on unseen data. In estimating $\tilde{p}(w_{j-1}w_j)$, we consider three different cases: $w_{j-1}w_j$ occurs in the training set ($\tilde{p}_1$); $w_{j-1}w_j$ doesn't occur in the training set but its class ngram $c_{j-1}c_j$ does ($\tilde{p}_2$); and neither $w_{j-1}w_j$ nor its class ngram $c_{j-1}c_j$ occur in the training set ($\tilde{p}_3$). That is, we take:

$$\tilde{p}(w_{j-1}w_j) = \begin{cases} \tilde{p}_1(w_{j-1}w_j) & \text{if } w_{j-1}w_j \in D \\ \tilde{p}_2(w_{j-1}w_j) & \text{if } w_{j-1}w_j \notin D, c_{j-1}c_j \in D \\ \tilde{p}_3(w_{j-1}w_j) & \text{otherwise} \end{cases} \quad (12.1)$$

for the first case:

$$\tilde{p}_1(w_{j-1}w_j) = \frac{\tilde{C}(w_{j-1}w_j)}{C_{tot}} \equiv \frac{C(w_{j-1}w_j) - D(w_{j-1}w_j)}{C_{tot}} \quad (12.2)$$

where $D(w_{j-1}w_j)$ is a discount, or an estimate of the difference between the training and test count of an n-gram. For the second case, we take $$\tilde{p}_2(w_{j-1}w_j) \approx \tilde{p}(c_{j-1}c_j)\tilde{p}(w_{j-1}|c_{j-1})\tilde{p}(w_j|c_j) \qquad (13)$$

where $$\tilde{p}(c_{j-1}c_j) = \frac{\tilde{C}(c_{j-1}c_j) - \sum_{w_{j-1}w_j \in c_{j-1}c_j} \tilde{C}(w_{j-1}w_j)}{C_{tot}} \qquad (13.1)$$

$$= \frac{\sum_{w_{j-1}w_j \in c_{j-1}c_j} D(w_{j-1}w_j) - D(c_{j-1}c_j)}{C_{tot}} \equiv \frac{\tilde{C}^{-w}(c_{j-1}c_j)}{\tilde{C}_{tot}}$$

and where $$\tilde{p}(w_j|c_j) = \frac{\sum_{w_{j-1}} D(w_{j-1}w_j) - D(w_j)}{\sum_{w_j \in c_j} \left[ \sum_{w_{j-1}} D(w_{j-1}w_j) - D(w_j) \right]} \equiv \frac{\tilde{C}^{-w}(w_j)}{\tilde{C}^{-w}(c_j)} \qquad (13.2)$$

where $\tilde{p}(w_{j-1}|c_{j-1})$ is defined analogously. Finally, we take:

$$\tilde{p}_3(w_{j-1}w_j) \approx \frac{C_{unseen}}{C_{tot}} \tilde{p}(w_{j-1})\tilde{p}(w_j) \qquad (14)$$

where $\tilde{C}_{unseen}$ has the value $$C_{tot} - \sum_{w_{j-1}w_j \in D} \tilde{C}(w_{j-1}w_j) - \sum_{c_{j-1}c_j \in D} \tilde{C}^{-w}(c_{j-1}c_j) = \qquad (14.1)$$

$$\sum_{c_{j-1}c_j \in D} D(c_{j-1}c_j) \text{ and } \tilde{p}(w_j) =$$

$$\frac{\sum_{w_{j-1}} D(w_{j-1}w_j) - D(w_j)}{\sum_{w_j} \left[ \sum_{w_{j-1}} D(w_{j-1}w_j) - D(w_j) \right]} \equiv \frac{\tilde{C}^{-w}(w_j)}{\tilde{C}^{-w}_{tot}}$$

Plugging these equations into eq. (12), we get:

$$\tilde{L}_{2g}^{joint}(C) \approx \sum_{c_{j-1}c_j \in D} \tilde{C}^{-w}(c_{j-1}c_j) \log \tilde{C}^{-w}(c_{j-1}c_j) - \qquad (14.2)$$

$$\sum_{c_{j-1} \in D} \tilde{C}^{-w}(c_{j-1}) \log \tilde{C}^{-w}(c_{j-1}) - \sum_{c_j \in D} \tilde{C}^{-w}(c_j) \log \tilde{C}^{-w}(c_j) +$$

$$\tilde{C}_{unseen} \left[ \log \frac{\tilde{C}_{unseen}}{C_{tot}} - \mathcal{H}(w_{j-1}) - \mathcal{H}(w_j) \right] + const(C)$$

where $H(w_j)$ denotes the entropy of the distribution $\tilde{p}(w_j)$. Notably, this new equation is similar to eq. (6) except for two main changes: Instead of terms like $C(c_j-1 c_j)$ and $C(c_j-1)$ we have terms like $\tilde{C}|w(c_j-1 c_j)$ and $\tilde{C}-w(c_j-1)$; and we have an additional term involving $\tilde{C}_{unseen}$. The first change essentially replaces word bigram counts with their discounts.

This makes sense in the presence of word n-gram features, as frequent bigrams will be primarily modeled through word bigram features rather than class bigram features. The term involving $\tilde{C}_{unseen}$ can be viewed as controlling the number of word classes. Without this term, the objective function prefers having as many classes as possible. This term is negative, and the value of $\tilde{C}_{unseen}$ is roughly proportional to the number of unique class bigrams in the training data. Thus, the more word classes, the larger $\tilde{C}_{unseen}$ will tend to be, and the more the corresponding term penalizes the total log likelihood. However, the $\tilde{C}_{unseen}$ term may not pick the best number of classes for Model M due to the differences between our objective function and the actual Model M likelihood. Thus, we apply a coefficient $\beta$ to this term to allow the number of classes to be adjusted.

For the trigram version of the objective function, we combine the log likelihoods of a bigram corpus and trigram corpus as in eq. (11). We also add in a prior term on the number of classes to prevent the number of classes from exploding, as well as a prior term to encourage words to be placed in the same word class as the unknown token. In this way, words with few counts will tend to be placed in this class unless there is strong evidence suggesting otherwise. To estimate discounts $D(\cdot)$, we evaluate both absolute discounting and the Good-Turing estimate.

Configurations disclosed herein determine word classes to improve prediction accuracy through better generalization given limited training data, as exhaustive training procedures, whether word or class based, tends to be computationally intensive, particularly for larger cluster sizes, word classes have been employed to denote groups (classes) of words tending to appear in similar contexts. Each word in the group receives similar treatment as the other words. Therefore, word based processing defines a probability of a word event, meaning a particular word following an N−1 sequence of words. Class based processing, in contrast, defines a probability based on classes of words, rather than individual words, typically expressed as P(c3|c1c2) that for a sequence of words including a word from class c1, followed by a word from class s2, a word from class 3 results. Configurations herein, however, employ a mix of word and class features, such that class is not limited to this form in the disclosed implementation. For instance, P(c3|w1w2) is a feature in the disclosed classing method. Class based processing acknowledges the fact that a training set may not feasibly include all permutations of words which may appear in a sequence, but capitalizes on the observation that certain groups, or classes, of words tend to appear in similar contexts. In the example above, "see you" might be expected to be followed by a day of the week, a time, or a relative expression such as "later" or "tomorrow." An optimal classing function attempts to identify groups (classes) which are the most accurate predictor of class based processing.

Example approaches herein depict language models employing these optimizing features, including: a) Absolute discounting with back-off interpolation smoothing, and b) an exponential model with word and class n-gram features. When a class n-gram model is used to smooth a word n-gram model, the class model is effectively only used for unseen word n-grams (i.e. when the word model needs to back off). Similarly, in an exponential model, word n-gram features can mask the use of class n-gram features on seen data, in a somewhat hybrid manner. Therefore the proposed method particularly optimizes the likelihood of unseen word n-grams for the clustering model.

In conventional classing models, all information about the word history must be encoded in word classes, and as a result, frequent words tend to be spread across word classes. When the class-based model are used in conjunction with word n-gram features, this condition no longer holds, and frequent words are free to be placed where they best belong for generating an optimal language model.

FIG. 1 is a context diagram of a language processing environment 100 suitable for use with configurations disclosed herein. Referring to FIG. 1, in the language processing environment 100, a production application 110 employs a language processing interface 112 for language processing capabilities to convert speech to text. The production application 110 typically executes on a user device 120 at the bequest of a user 122, and may be, for example, a cellphone 120-1, laptop or desktop computer 120-2, PDA 120-3, settop box 120-4 in conjunction with cable TV, or other suitable device. A language processing server 130 is accessible via the language processing interface 112, typically via an Internet 114, wireless 116 or other electronic connection 118. Alternatively, the language processing capability may be accessible directly to the production application 110 via a repository 129, if sufficient computing resources are available. In either case, a language model 150 provides a statistical model of language usage for predicting words in a sequence of words spoken by the user. The language processing server 130 employs the language model 150 for predicting, given a sequence of N−1 words, a likelihood of an Nth word in the sequence (i.e. the next word). Based on spoken input from the user 122, the production application 110 invokes the language processing interface 112 to send a request 140 including the given sequence to the language processing server 130. The server 130 returns a response 141 indicative of at least one word and the probability that it follows the words in the request 140. Applying the model 150 to the words received from the user 122, the model 150 can predict the most likely next word, the 2nd most likely, etc. such that the language processing server 130 may evaluate from among the most likely candidates. Typically a cluster of 2 or 3 words is employed, meaning that the previous 1 or 2 words spoken by the user are evaluated to predict the 2nd or 3rd, respectively. Larger cluster sizes (N-grams) of words may be employed if sufficient computing resources are available.

Figure 2:
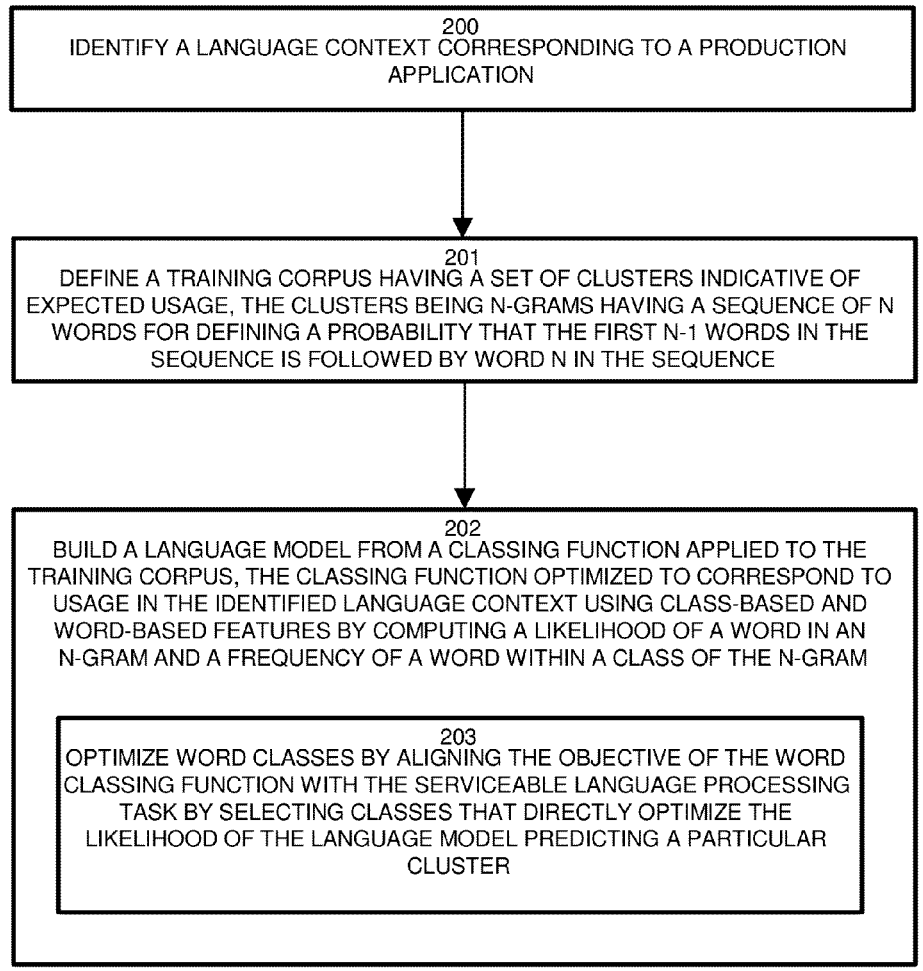
FIG. 2 is a flowchart of language processing in the environment of FIG. 1.

FIG. 2 is a flowchart of language processing in the environment of FIG. 1. Referring to FIGS. 1 and 2, at step 200, the method of optimizing the classing function for use with a language model such that the classing function defines classes of words sharing a similar likelihood of appearing in a production application context includes identifying a language context corresponding to a production application 110. The language context refers to the set of, or sequences of words likely to be received in actual usage or testing of the language model. The classing function is used in training the language model by selecting classes of words that allow the language model to achieve a high rate of recognition. The production application 110 may be any suitable application in receipt of interactive speech from a user 122 via the language processing interface 112, such as a cell phone based application, voice menu, or other command driven application. Typically, the production application 110 may employ parallel interfaces allowing either keyboard or spoken voice commands. The language processing sever 130 defines a training corpus having a set of clusters indicative of expected usage, in which the clusters are n-grams having a sequence of n words for defining a probability that the first n−1 words in the sequence is followed by word n in the sequence, as disclosed at step 201. Such clusters represent a size of a word sequence considered by the language model 150, typically 2 (a bigram) or 3 (a trigram). The training corpus includes a training set 152 (FIG. 3, below) of words intended to emulate the words that will be received by the production application 110.

Using the training corpus, the language processing server 130 builds a language model 150 from a classing function 135 (FIG. 3, below) applied to the training corpus, such that the classing function is optimized to correspond to usage in the identified language context using class-based and word-based features by computing a likelihood of a word in an n-gram, and also a frequency of a word within a class of the n-gram, as depicted at step 202. The class based features treat all words within the class with a similar likelihood of appearance, while word based processing considers likelihood of only the actual word appearing. This includes optimizing word classes by aligning the objective of the word classing function with the serviceable language processing task by selecting classes that directly optimize the likelihood of the language model 150 predicting a particular cluster, as described at step 203. The language model 150 is most effective (optimal) when the groups of words in each cluster correspond with the words received by the production application 110, rather then a general class distribution, for example. The word classing function 135 therefore attempts to emulate, or approximate, the word clusters that would be received by the production application 110 in actual use, described further below.

An example of a classing function employing a back-off feature are as follows. A class bigram model is employed as the back-off model within a word n-gram model. Specifically disclosed is a model with absolute discounting and interpolation smoothing. For the word bigram case we have:

$$p(y|x)=n^*(x,y)/n(x)+a(x)b(c(y)|c(x))b(y|c(y))$$

where n(x, y) is the observed count of bigram (x, y) and n* is the discounted count. For an absolute discounting model, n* is $n^*(x, y)=\max\{n(x, y)-D, 0\}$ if (x,y) is retained
=0 if (x,y) is pruned
(For simplicity on a single discount parameter D is used, but the remainder of the derivation remains the same for more complex discounting schemes.) a(x) is chosen to ensure normalization of the distribution p(y|x) and b is the aforementioned class back-off distribution. We would like to choose b so that the marginals P(c1,c2) for all class bigrams and P(y) for all words are preserved. That is, we require:

P(y)=sum {x} P(x)p(y|x) for all y in V
P(c1,c2)=sum {x in c1} P(x) sum {y in c2} p(y|x) for all c1,c2 in C×C
(V denotes the vocabulary, but dropped below for readability)
Approximating the true marginal distributions with the empirical marginal distributions yields:
n(y)=sum{x} n(x)p(y|x)
=sum{x} n(x)n*(x, y)/n(x)+sum{x} n(x)a(x)b(c(y)|c(x))b(y|c(y))
=sum{x} n*(x,y)+b(y|c(y))sum {x} n(x)a(x)b(c(y)|c(x))
Since sum{x} n(x)a(x)b(c(y)|c(x)) is independent of y given c(y), we get that b(y|c(y)) is proportional to n(y)−sum{x} n*(x,y). Thus, b(y|c(y)) is proportional to the sum of the discounted and pruned mass for y. For the simple absolute discounting model this equals:
sum{x1(x,y) is pruned} n(x,y)+sum{x1(x,y) is retained} D
For the second set of constraints we get
n(c1,c2)=sum{x in c1} n(x) sum{y in c2} n*(x,y)/n(x) +sum{x in c1} n(x) sum{y in c2} a(x)b(c2|c1)b(y|c2)
=sum{x in c1} sum{y in c2} n*(x,y) +b(c2|c1) sum{x in c1} n(x)a(x)
Since sum {x} n(x)a(x) is independent of (c1,c2), b(c2|c1) is proportional to n(c1,c2)−sum{(x,y) in (c1,c2)}n*(x,y). Thus, b(c2|c1) is proportional to the sum of the discounted and pruned mass for y in the context c1. For the simple absolute discounting model this equals:

sum{(x,y) in (c1,c2) is pruned} n(x,y)+sum {(x,y) in (c1, c2) is retained} D

This approach provides a recipe for calculating the parameters of the (back-off) class bigram distribution given a class assignment. The approach can also be shown more rigorously, that it is appropriate to optimize the class assignment using the discounted mass as opposed to the observed counts as training data.

Another class-based language model employs a hybrid of word and class n-gram features. Classing functions may employ either hard or soft classing. In hard classing, each word belongs to a single class. In many applications, such as those involving Part-of-Speech (POS) tagging it may be useful to allow words to belong to multiple classes.

Evaluating the example hybrid approach is more complex when using soft classing, because this approach considers all possible class sequences for each word sequence. Ideally, one should sum the probabilities of all class labels when computing the likelihood of a word sequence, but this approach employs Viterbi approximation and considers only the most likely class sequence when calculating the likelihood of a word sequence. One can perform this computation using dynamic programming, and implement this using any suitable method such as a state machine toolkit. By using the weighted automata framework, it is straightforward both to compute the likelihood of individual utterances as well as to do lattice rescoring. The hybrid training is basically unchanged, except that each word in the training data must be explicitly labeled with its class. In a hard classing approach, in contrast, the class for each word is unambiguous.

Part-of-speech (POS) tags can be considered as natural syntactic classes for words. One particular approach proposes POS tags as classes for shrinkage-based language models both in hard and soft classing modes. Alternatively, many of the spoken dialog systems have domain specific vocabulary, which naturally cluster into distinct classes. For example, in an air travel reservation task, all the cities, states, countries, airlines, flight numbers, days, months, etc. are separate classes. Similarly, in a financial transaction application, stocks, plan names, bonds, and etc. make up their own classes. Typically, the domain vocabulary contains words that are not observed in training data used to build the language model. However, the unobserved words can easily be substituted for words that share the same class. For example, in the air travel reservation task, we may not observe the city Boise but we can easily replace Denver in a training utterance, "I want to book a ticket to Denver" with Boise to create a legitimate sentence in this domain. Therefore, we propose to use predefined semantic and/or syntactic based classes in combination with the automatic classing for shrinkage-based language models. In the above example (air travel), an vocabulary expected to be received by the production application 110 differs from a general usage vocabulary, thus a language model cognizant of expected language context has a greater likelihood of accurate predictions.

Figure 3:
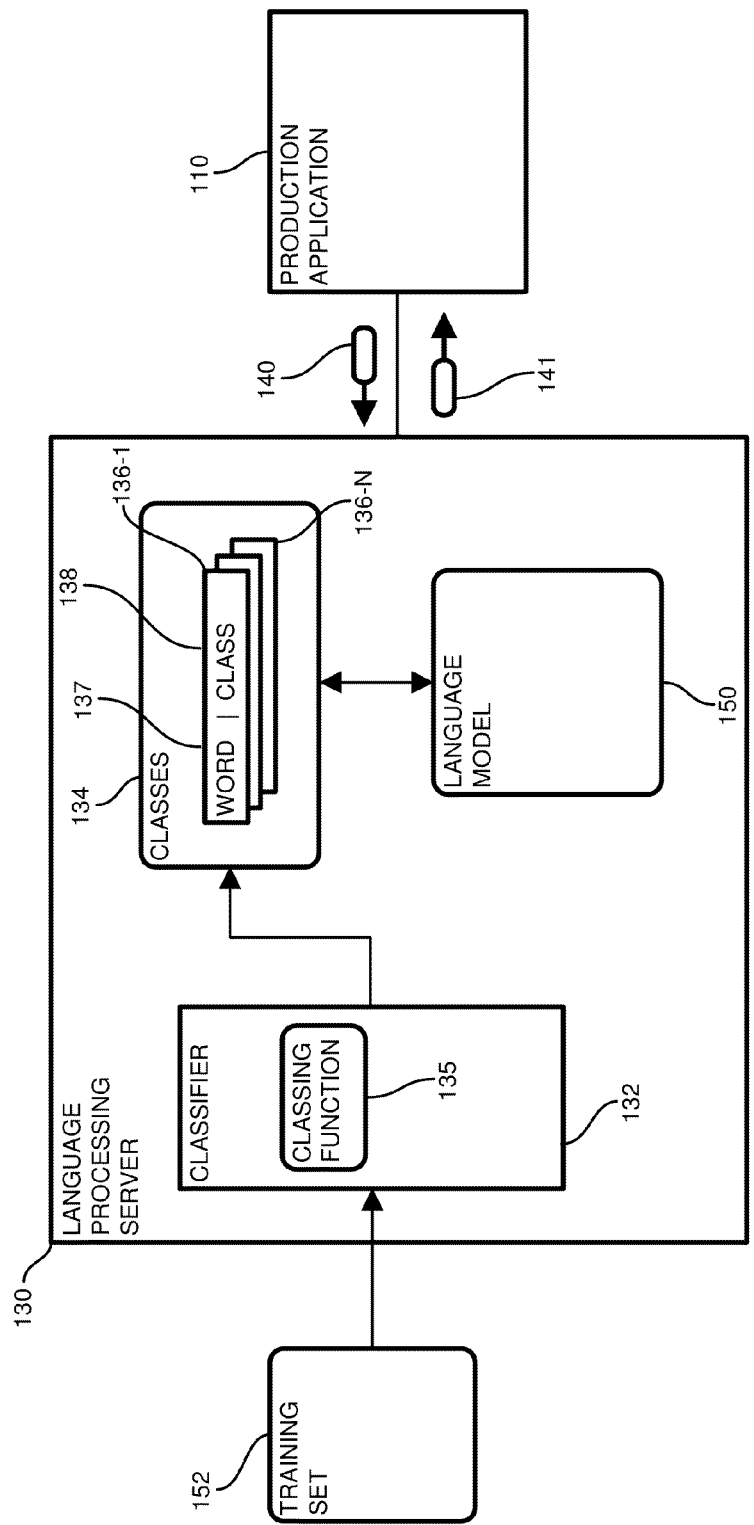
FIG. 3 is a block diagram of language processing according to FIG. 2.

FIG. 3 is a block diagram of language processing according to FIG. 2. Referring to FIGS. 1 and 3, the language model 150 undergoes a training, or learning phase prior to invocation by the production application 110. The training phase considers a representative sample of language usage in the form of cluster sequences anticipative of expected usage from the production application 110. A training set 152 includes sequences of words intended to most closely approximate actual usage encountered by the production application 110.

A classifier 132 receives the training set 152 and generates the model 150 and classes 134 depicting the language usage to which the model 150 applies. The more closely the model approximates actual usage, the faster and more accurate the model will process speech 140 from the production application 110.

As indicated above, the language processing server 130 employs word based and class based analysis. For class based analysis, the classifier 132 generates the classes 134, which include a set of entries 136-1 . . . 136-N (136 generally), also referred to as a tuple. Each entry 136 includes a word 137 and a corresponding class assignment 138. During language processing, words in the same class 138 receive similar treatment as other words in the class 138. This tends to allow recognition of a greater number of words as less common words will tend to be recognized as readily as more frequently used words in the same class 138. The class 138 may be identified by a class identifier denoting a field value, such as in a list entry or database table, or may group sets of words together for denoting a class. A variety of organizations for denoting word classes may be applied.

Figure 4:
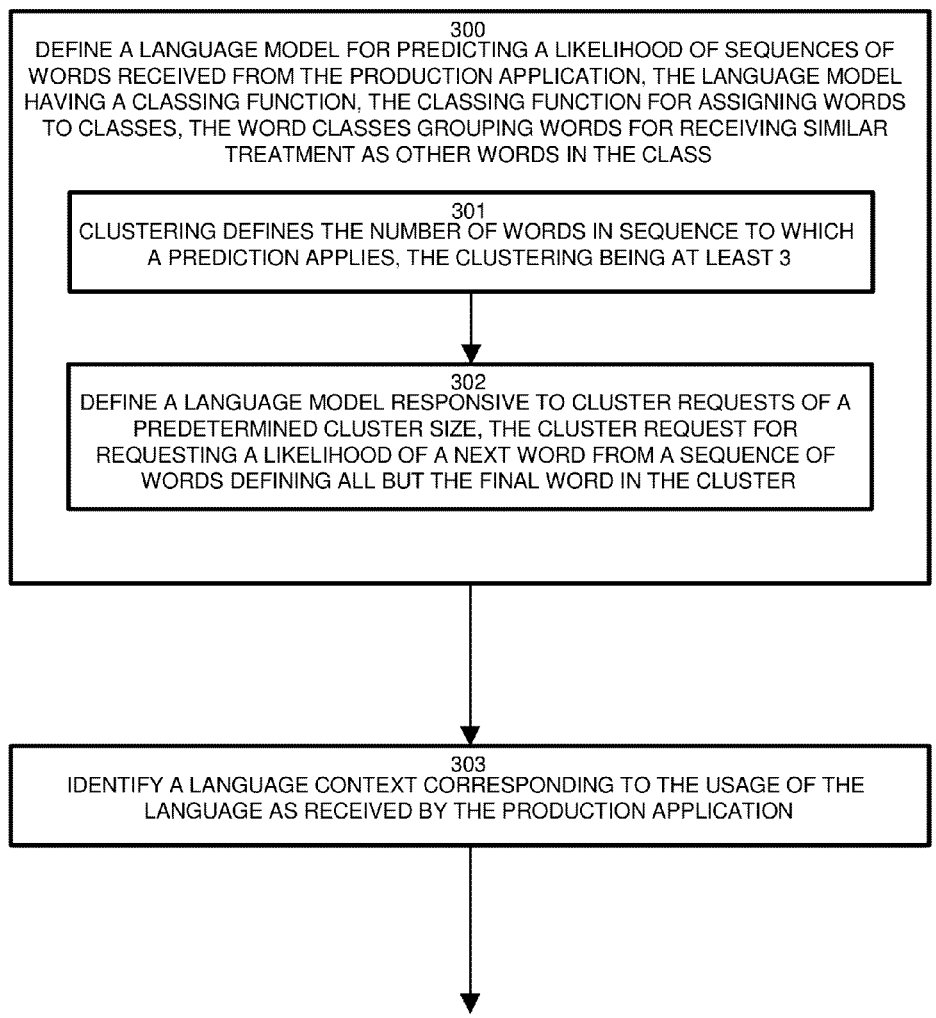
FIGS. 4-6 are a flowchart of language processing by a production application as in FIG. 3.
Figure 5:
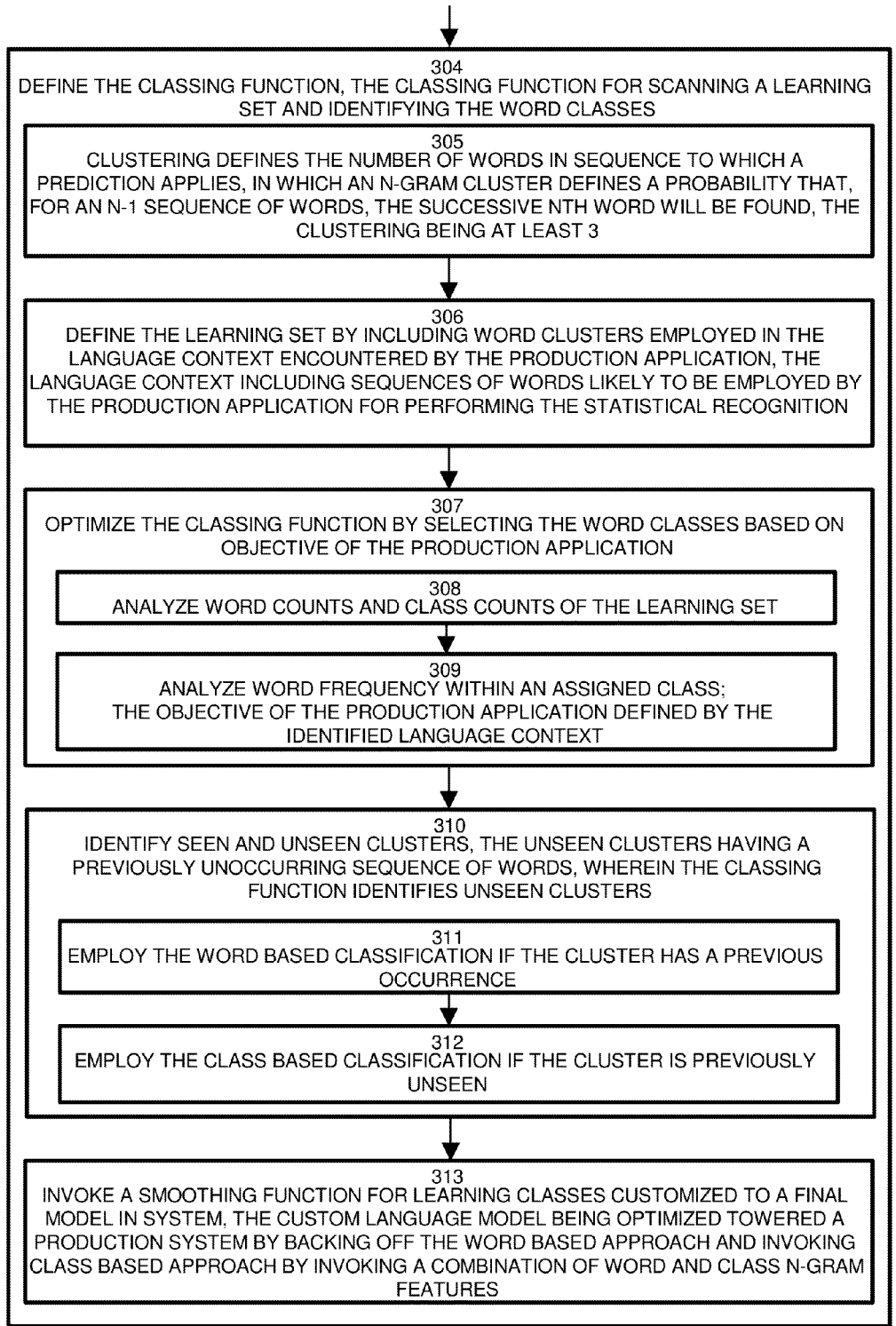
Figure 6:
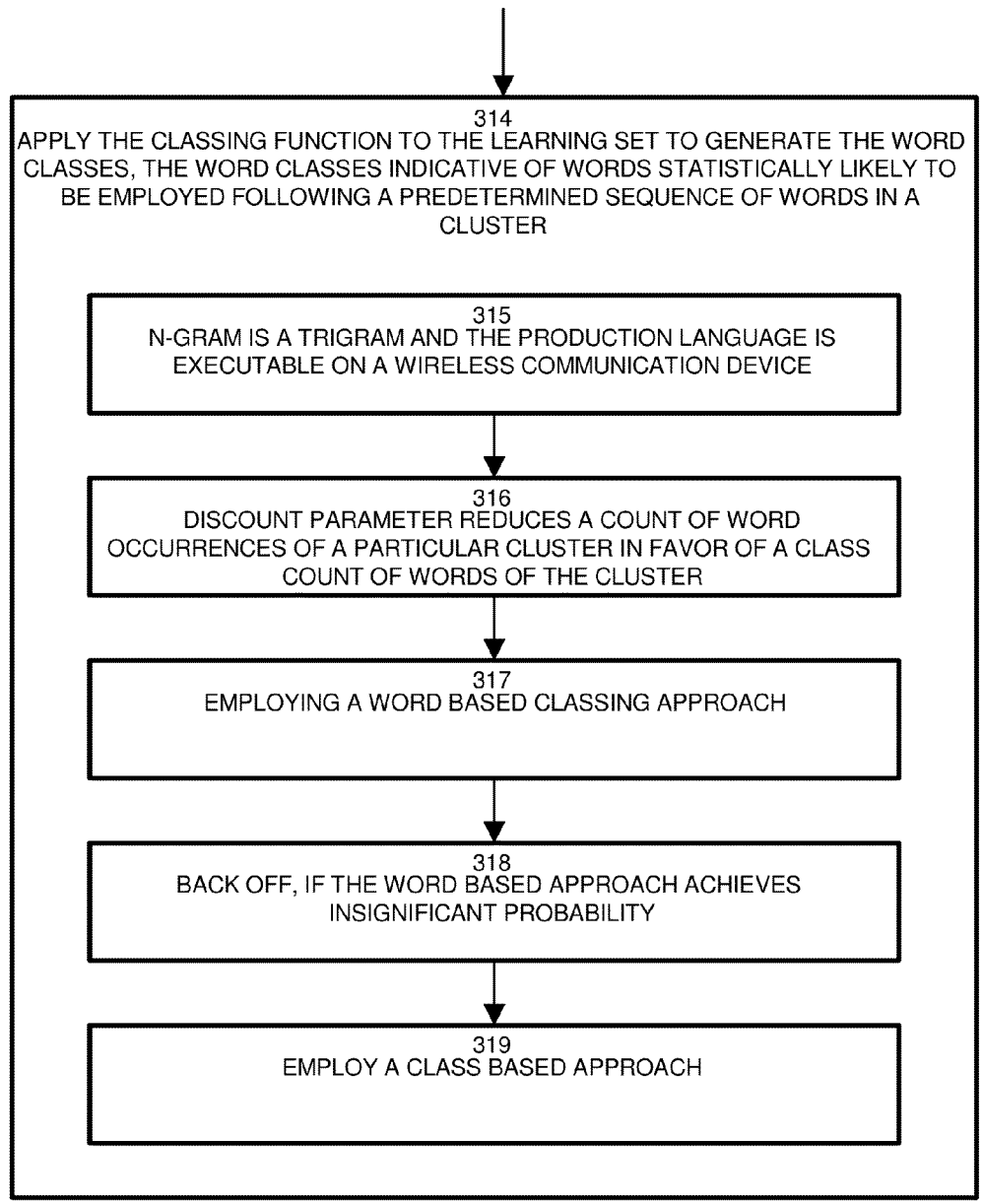

FIGS. 4-6 are a flowchart of language processing by a production application as in FIG. 3. Referring to FIGS. 1, 3 and 4-6, in the language model 150 defining a probability for sequences of words, in which the language model 150 is invoked by a production application 110 responsive to an end user 122 for performing statistical language recognition services, assignment of words 137 to classes 138 includes defining the language model 150 for predicting a likelihood of sequences of words received from the production application 110, such that the language model 150 has a classing function 135. The classing function 135 is for assigning the words 137 to the classes 138, such that the word classes 134 group words for receiving similar treatment as other words in the class, as depicted at step 300. The language model 150 and the classing function 135 employ a clustering, such that the clustering defines the number of words in a sequence to which a prediction applies. In the example configuration, the clustering is at least 3, as shown at step 301, however other cluster sizes maybe employed.

In the example arrangement, the defined language model 150 is responsive to cluster requests of the predetermined cluster size, such that the cluster request is for requesting a likelihood of a next word from a sequence of words defining all but the final word in the cluster, as depicted at step 302, or more simply, the likelihood of an occurrence of a particular cluster. The cluster, therefore, includes a sequence of words of the cluster size, and the language model employs the clusters for computing a probability of a particular word appearing, given the immediate previous words.

The language model 1450 identifies the language context corresponding to the usage of the language as received by the production application 110, as depicted at step 303. The language context includes the usage of the language as received by the production application 110, thus will tend to include or recognize clusters received by the production application 110 in actual usage.

The classifier 132 receives, computes or otherwise defines the classing function 135, in which the classing function 135 is for scanning a learning set and identifying the word classes, as depicted at step 304. This includes, at step 305, establishing a clustering of the predetermined size, such that the clustering defines the number of words in sequence to which a prediction applies. An n-gram cluster, therefore, defines a probability that, for an n−1 sequence of words, the successive nth word will be found, the clustering being at least 3. The cluster size drives up computability in an exponential manner, thus a larger cluster size, while improving accuracy, rapidly becomes computationally infeasible. A typical cluster size is 2 or 3 but can theoretically be any size, limited only by available computing resources.

The classifier 132 receives or defines the learning set (also called a training set) 152 by including word clusters employed in the language context encountered by the production application 110, and in which the language context includes sequences of words likely to be employed by the production application for performing the statistical recognition, as depicted at step 306. The classifier 132 optimizes the classing function 135 by selecting the word classes 134 based on objective of the production application 110, as disclosed at step 307. This includes analyzing word counts and class counts of the learning set, as depicted at step 308, and analyzing word frequency within an assigned class, as disclosed at step 309. The objective of the production application 110 is defined by the identified language context, meaning the language phrases and sentences likely to be encountered by the production application, as opposed to the language as a whole.

As the probability estimates of a given word are based on counts of previous occurrences of the n-gram (cluster) including the given word, an unseen n-gram results in a zero or null probability. Therefore, for commonly used words, the word based counts produce a sharper, more accurate probability. In class based processing, an occurrence of any word in the class triggers the count. Thus, an unseen cluster still has a nonzero probability if any word in the class has occurred. The class based processing provides a broader recognition scope by not requiring exact previous occurrences of a cluster, but instead asks if a "similar" n-gram has appeared, similarity being defined by the classes and similar treatment of the words in the class.

In the example arrangement, the classing function 135 identifies seen and unseen clusters, in which the unseen clusters have a previously unoccurring sequence of words and wherein the classing function 135 identifies unseen clusters, as shown at step 310. Unseen clusters are analyzed by employing the word based classification if the cluster has a previous occurrence, as depicted at step 311, and employing the class based classification if the cluster is previously unseen, as shown at step 312.

The classifier further (step 313) defines the classing function 135 for generating a custom language model 150 for customizing classes to a particular production application by invoking a smoothing function for learning classes customized to a final model in system, such that the custom language model 150 is optimized towered a production system by backing off the word based approach and invoking class based approach by invoking a combination of word and class n-gram features.

Once the classifier 132 defines the classing function 135, the classifier 132 applies the classing function 135 to the learning (training) set 152 to generate the word classes 134, such that the word classes are indicative of words 137 statistically likely to be employed following a predetermined sequence of words in a cluster, as depicted at step 314. Application of the classing function 135 to the training set 152, in the example arrangement, is such that the n-gram is a trigram and the production language is executable on a wireless communication device 120-1, as depicted at step 315. Other size n-grams and target production languages may be employed in alternate arrangements.

As indicated above, the classing function 135 employs class based and word based features. At step 316, the classing function 135 further comprises a discount parameter, such that the discount parameter reduces a count of word occurrences of a particular cluster in favor of a class count of words of the cluster. Therefore, optimizing the classing function 135 further comprises, at step 317 employing a word based classing approach, backing off, if the word based approach achieves an insignificant probability, as depicted at step 318, and employing a class based approach, as shown at step 319.

Those skilled in the art should readily appreciate that the programs and methods for generating language processing classes as defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method of generating language processing classes has been particularly shown and described with references to embodiments thereof, it will be understood by those skilled in the art that various changes in form and details may be made therein without departing from the scope of the invention encompassed by the appended claims.

What is claimed is:

1. In a language model employing a classing function defining classes of words, each of the classes grouping words sharing a similar likelihood of appearing in a production application context, a method of optimizing the classing function comprising:
   identifying a language context corresponding to a production application, the language context based on usage encountered by a language model invoked by the production application;
   defining a training corpus having a set of clusters indicative of expected usage, the clusters being n-grams having a sequence of n words for defining a probability that the first n−1 words in the sequence is followed by word n in the sequence; and
   building a language model from a classing function applied to the training corpus, the classing function optimized to correspond to usage in the identified language context using class-based and word-based features by computing a likelihood of a word in an n-gram and a frequency of a word within a class of the n-gram, optimizing the classing function further comprising:
   employing a word based classing approach;
   backing off, if the word based approach indicates a null probability; and
   employing a class based approach; further comprising:
      determining seen and unseen clusters, the unseen clusters having a previously unoccurring sequence of words;
      employing the word based classification if the cluster has a previous occurrence, identifying a discount parameter, the discount parameter reducing a count of word occurrences of a particular cluster in favor of a class count of words of the cluster;

backing off using the discount parameter and employing a class based approach if the cluster is unseen, unseen clusters based on occurrence of any of the words in the cluster, the unseen cluster having a nonzero probability if any word in the class of words has occurred;

the discount parameter reducing a count of word occurrences of a particular cluster in favor of a class count of words of the cluster; and the discount parameter defining an absolute discounting model, further comprising:
identify a discount parameter indicative of a reduction of a word count of words in a cluster;
determining if the cluster is to be pruned or retained in the corpus;
subtracting the discount parameter from a maximum count of the observed word based count of the cluster to compute a discounted count; or
defining the discount count of the cluster as zero if the cluster is pruned.

2. The method of claim 1 further comprising defining a classing function for generating a custom language model for customizing classes to a particular production application by invoking a smoothing function for learning classes customized to a final model in system, the custom language model being optimized toward a production system by backing off the word based approach and employing a class based approach by invoking a combination of word and class n-gram features.

3. The method of claim 2 wherein the n-gram is a trigram and the production application is executable on a wireless communication device.

4. The method of claim 2 further comprising a clustering, the clustering defining the number of words in sequence to which a prediction applies, the clustering being at least 3.

5. The method of claim 4 further comprising identifying seen and unseen clusters, the unseen clusters having a previously unoccurring sequence of words, wherein the classing function identifies unseen clusters by:
employing the word based classification if the cluster has a previous occurrence, and
employing the class based classification if the cluster is previously unseen.

6. The method of claim 5 further comprising optimizing word classes by aligning the objective of the word classing function with the serviceable language processing task by selecting classes that directly optimize the likelihood of the language model predicting a particular cluster.

7. In a language model defining a probability for sequences of words, the language model invoked by a production application responsive to an end user for performing statistical language recognition services, a method of assigning words to classes comprising:
defining a language model for predicting a likelihood of sequences of words received from the production application, the language model having a classing function, the classing function for assigning words to classes, the word classes grouping words for receiving similar treatment as other words in the class;
identifying a clustering, the clustering defining the number of words in sequence to which a prediction applies, in which an n-gram cluster defines a probability that, for an n−1 sequence of words, the successive nth word will be found;
identifying a language context corresponding to the usage of the language as received by the production application;
defining the classing function, the classing function for scanning a learning set and identifying the word classes by:
employing a word based classing approach;
backing off, if the word based approach indicates a null probability; and
employing a class based approach; further comprising:
determining seen and unseen clusters, the unseen clusters having a previously unoccurring sequence of words;
employing the word based classification if the cluster has a previous occurrence,
identifying a discount parameter, the discount parameter reducing a count of word occurrences of a particular cluster in favor of a class count of words of the cluster; and
backing off using the discount parameter and employing a class based approach if the cluster is unseen, unseen clusters based on occurrence of any of the words in the cluster, the unseen words has occurred the discount parameter reducing a count of word occurrences of a particular cluster in favor of a class count of words of the cluster;
the discount parameter defining an absolute discounting model, further comprising:
identifying a discount parameter indicative; of a reduction of a word count of words in a cluster;
determining if the cluster is to be pruned or retained in the corpus;
count of the observed word based count of the cluster to compute a count of the observed word based count of the cluster to compute a discounted count; or
defining the discount count of the cluster as zero if the cluster is pruned;
applying the classing function to the learning set to generate the word classes, the word classes indicative of words statistically likely to be employed based on predetermined sequences of words in the learning set; and
optimizing the classing function by selecting the word classes based on an objective of the production application, optimizing further including:
analyzing word counts and class counts of the learning set; and
analyzing word frequency within an assigned class;
the objective of the production application defined by the identified language context.

8. The method of claim 7 wherein the clustering being at least 3.

9. The method of claim 7 further comprising defining the learning set by including word clusters employed in the language context encountered by the production application, the language context including sequences of words likely to be employed by the production application for performing the statistical recognition.

10. The method of claim 9 further comprising defining a language model responsive to cluster requests of a predetermined cluster size, the cluster request for requesting a likelihood of a next word from a sequence of words defining all but the final word in the cluster.

11. The method of claim 7 further comprising identifying seen and unseen clusters, the unseen clusters having a previously unoccurring sequence of words, wherein the classing function identifies unseen clusters by:

employing the word based classification if the cluster has a previous occurrence, and employing the class based classification if the cluster is previously unseen.

12. The method of claim 7 wherein the classing function further generates a set of entries including each word and a corresponding class identifier, each word in the class of words sharing a common class identifier.

13. The method of claim 12 wherein the word classes further comprise a set of tuples, each tuple including tuple including a word and corresponding class, the classing function assigning classes by receiving a word previously unseen in a cluster;

identifying a class of words appearing in a similar context;
reading a class identifier of the identified class; and
assigning the class identifier to the word.

14. The method of claim 13 further comprising reassigning a group of words to another class by:

identifying, based the received word, a set of words occurring in a similar language context; and reassigning the received word and the set of words to another class by assigning a common class identifier.

15. The method of claim 14 wherein optimizing further comprises receiving, in an iterative manner, clusters of words and reassigning class identifiers for increasing the likelihood of the language model predicting a cluster in the production application.

16. A computer program product on a non-transitory computer readable storage medium having instructions for performing a method of defining a classing function employed for training a language model, the language model invoked for linguistic processing supporting a production application, the method comprising:

identifying trigrams representative of a language context, the language context derived from word sequences likely to be received from the production application for predicting a word;

defining a language model responsive to the production application for the linguistic processing, the language model employing class-based processing, the classes grouping words for receiving similar treatment as other words in the class;

defining a classing function for partitioning the words into the classes, the classing function for optimizing the classes such that a trigram including a word in a particular class are significant predictors of trigrams including other words in the particular class, the classing function further comprising:

employing a word based classing approach;
backing off, if the word based approach indicates a null probability; and employing a class based approach; further comprising:
determining seen and unseen clusters, the unseen clusters having a previously unoccurring sequence of words;

employing the word based classification if the cluster has a previous occurrence, identifying a discount parameter, the discount parameter reducing a count of word occurrences of a particular cluster in favor of a class count of words of the cluster; and backing off using the discount parameter and employing a class based approach if the cluster is unseen, unseen clusters based on occurrence of any of the words in the cluster, the unseen cluster having a nonzero probability if any word in the class of words has occurred, the discount parameter reducing a count of word occurrences of a particular cluster in favor of a class count of words of the cluster; and the discount parameter defining an absolute discounting model, further comprising:

identifying a discount parameter indicative of a reduction of a word count of words in a cluster;

determining if the cluster is to be pruned or retained in the corpus;

subtracting the discount parameter from a maximum count of the observed word based count of the cluster to compute a discounted count; or defining the discount count of the cluster as zero if the cluster is pruned;

the trigrams denoting a frequency of a sequence of words, the classing function optimizing the model toward the production application by identifying, for a particular trigram, a count of the first word in the trigram
a count of the second word in the trigram
a count of the words in the class of the first word of the trigram;
a count of the words in the class of the second word of the trigram;
a frequency of the first word relative to other words in the class of the first word; and
a frequency of the second word relative to the other words in the class of the second word;

applying the defined classing function to a corpus of words for generating a model; and employing the model for identifying, for a first and second word of a trigram received from the production application, a likelihood of each of a set of candidate third words for the trigram.

17. The method of claim 16 further comprising identifying seen and unseen clusters of trigrams, the unseen clusters having a previously unoccurring sequence of words, wherein the classing function identifies unseen clusters by:

employing the word based classification if the cluster has a previous occurrence, and employing the class based classification if the cluster is previously unseen.

18. The method of claim 7 wherein the classing function groups a plurality of classes of words independent from others of the plurality of classes of words, the classes including words sharing a similar likelihood of appearing in a production application context.

19. The method of claim 7 further comprising classing words according to a hard classing approach such that each word appears in only one class.

20. The method of claim 1 further comprising applying the discount parameter to compute a reduction from an observed maximum word count of a cluster by the discount parameter to compute a discounted count of a cluster.

21. The method of claim 20 wherein the discount parameter reduces a count based on a word count of the words in the cluster toward a class count of the words in the cluster.

22. The method of claim 1 further comprising selecting the classes based on a production application defining a context in which the clusters are expected to be encountered.

* * * * *